United States Patent [19]
Lowy et al.

[11] 3,787,121
[45] Jan. 22, 1974

[54] MULTIPLE FUNCTION SPECTROPHOTOMETER HAVING AN AUTOMATICALLY STABILIZED CHOPPER DISC

[75] Inventors: George W. Lowy; Joseph M. Conlon, both of Silver Spring; Byron E. Marcus, Columbia, all of Md.

[73] Assignee: Baxter Laboratories, Inc., Morton Grove, Ill.

[22] Filed: Dec. 18, 1972

[21] Appl. No.: 315,875

[52] U.S. Cl............. 356/93, 356/51, 356/94, 356/97, 356/100, 250/233
[51] Int. Cl............. G01j 3/42, G01j 3/12
[58] Field of Search..... 356/93, 94, 95, 97, 99, 100, 356/101, 51; 250/233; 350/274

[56] References Cited
UNITED STATES PATENTS
3,712,738   1/1973   Yamamoto ................. 356/93

Primary Examiner—Ronald L. Wibert
Assistant Examiner—V. P. McGraw
Attorney, Agent, or Firm—Herman L. Gordon

[57] ABSTRACT

A spectrophotometer of the two-beam type employing two adjustable monochromators and employing a rotating chopper disc to provide time-sharing operation, such as split-beam operation, dual wavelength operation, or other desired modes of operation. The chopper disc motor is stabilized by a fiber optic feedback system and cooperating electronic system utilizing light beams reflected by the underside of the chopper disc and photo diodes responding to these reflections. The main optical system includes an adjustable lens element coupled to one of the monochromators to compensate for variations in refractive index of the lens element with wavelength. The electronic readout system is gated by the chopper disc stabilizing system to maintain synchronism of the readout signals with the two monochromatic excitation beams.

19 Claims, 5 Drawing Figures

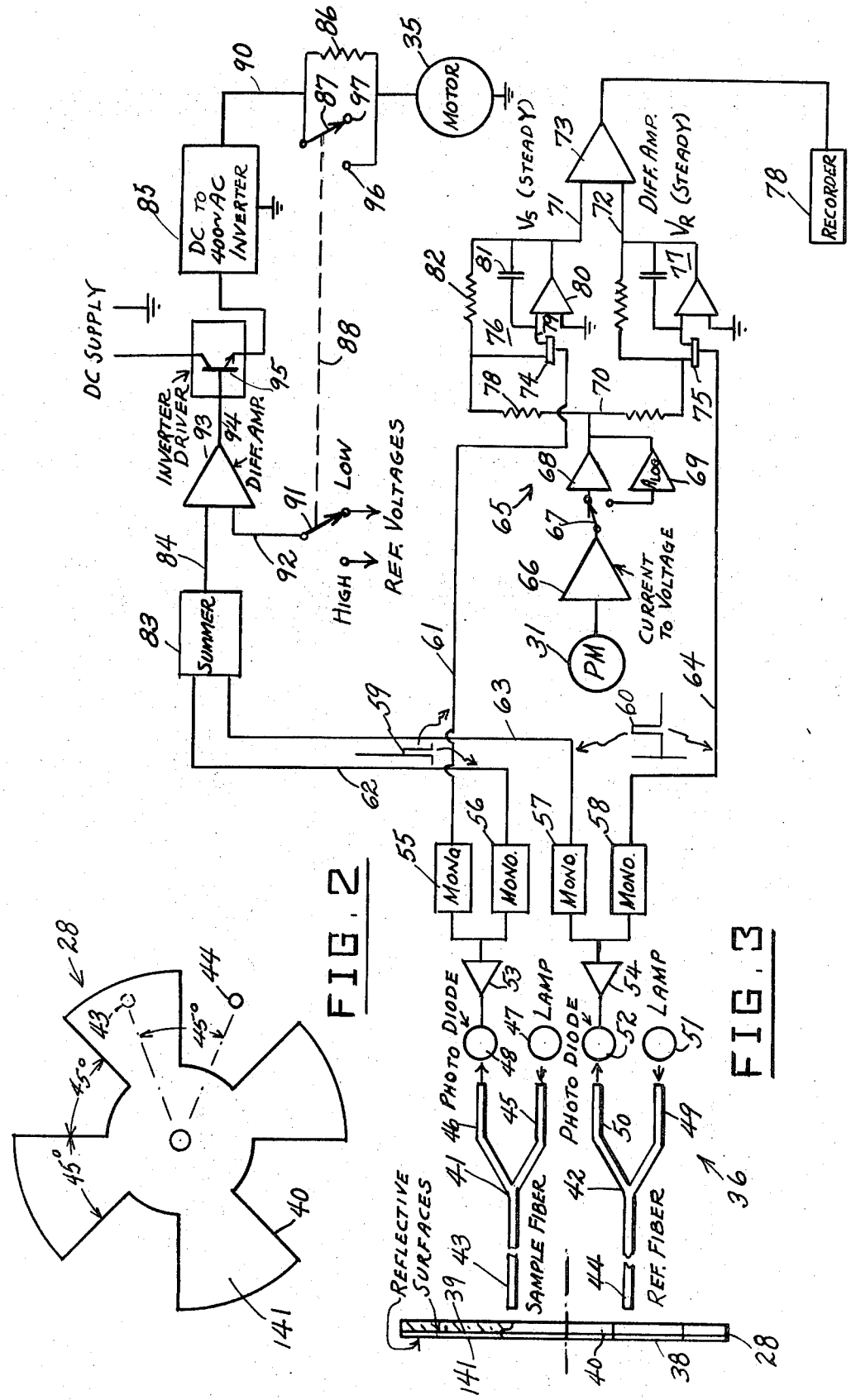

3,787,121

MULTIPLE FUNCTION SPECTROPHOTOMETER HAVING AN AUTOMATICALLY STABILIZED CHOPPER DISC

This invention relates to spectrophotometers, and more particularly to spectrophotometers of the type employing two monochromatic excitation beams.

A main object of the invention is to provide a novel and improved spectrophotometer of the two-beam type which can be employed in a variety of different modes of operation, such as in the split beam mode, the dual wavelength mode, the dual wavelength scanning mode, and various other modes, and which provides wide flexibility of operation, expanded sample-handling capability, and improved optical performance.

A further object of the invention is to provide an improved spectrophotometer of the type employing two monochromatic excitation beams and an accompanying system which can be adjusted to provide a wide range of different modes of operation, such as a split-beam mode wherein a single monochromator is used to scan either the entire usable wavelength range or a relatively small increment of the range, and wherein the working beam is time-shared through a reference cell and a sample cell, a dual wavelength mode wherein one monochromator is set at a reference wavelength (such as an isosbestic point) and the other monochromator is set at a different wavelength (such as a nearby absorption peak) and the reference and sample beams are time-shared through a single cell, a dual-wavelength scanning mode wherein one monochromator is set at a reference wavelength and the other monochromator scans over a wavelength increment, with the reference and sample beams being time-shared through a single cell, a derivative mode wherein the two monochromators are locked together at slightly different wavelengths, the two beams being time-shared through a single cell and a derivative spectrum being obtained by scanning over a pre-selected wavelength range, a rapid kinetics mode wherein the optical chopper operates at relatively high speed, or in a single beam mode, the spectrophotometer having a high degree of reliability, being stable in performance, and having wavelength-compensating lens adjusting means.

A still further object of the invention is to provide an improved spectrophotometer as above described having dual radiation sources providing different types of emission, with means to utilize either radiation source, whereby to provide a widened range of excitation wavelengths.

Further objects and advantages of the invention will become apparent from the following description and claims, and from the accompanying drawings, wherein:

FIG. 2 is an enlarged plan view of the optical chopper disc employed in the spectrophotometer of FIG. 1, said view being taken substantially on the line 2—2 of FIG. 1.

FIG. 3 is a schematic block diagram showing the main electrical components of the spectrophotometer of FIG. 1 and showing schematically the optical components of the chopper disc stabilizing system employed in the spectrophotometer.

Figure 1:
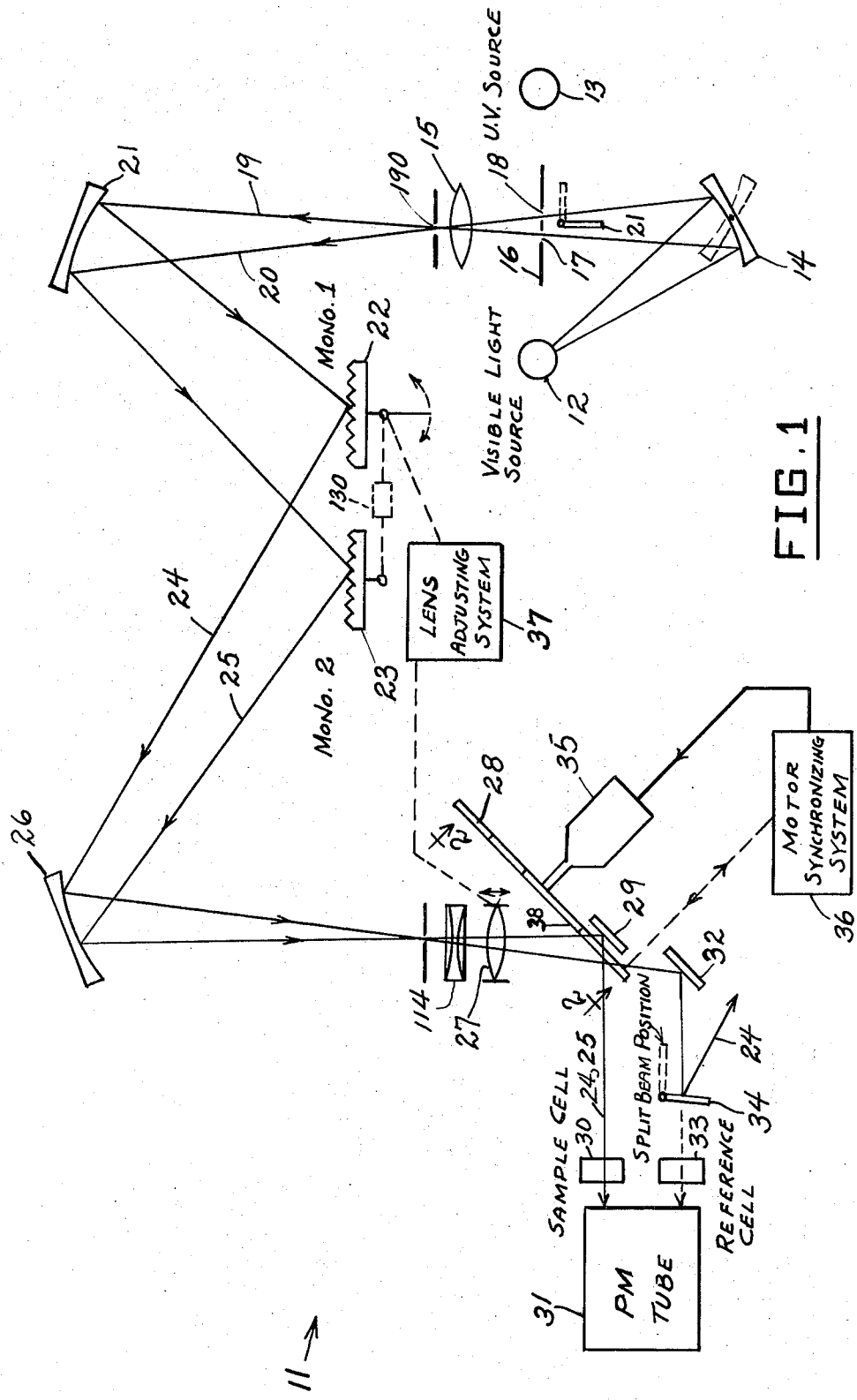
FIG. 1 is a diagram schematically showing the main components of an improved spectrophotometer constructed in accordance with the present invention.

Referring to the drawings, and more particularly to FIG. 1, 11 generally designates a typical multiple-function spectrophotometer constructed in accordance with the present invention. The spectrophotometer 11 comprises alternative radiation sources 12 and 13 which may be employed to provide excitation radiation. Source 12 comprises a tungsten lamp or other suitable source of visible light, and source 13 comprises a deuterium lamp or other suitable source of radiation extending into the ultra-violet range, whereby the two sources afford access to a wide range of excitation wavelengths, namely, from approximately 200 to 1200 nm. A pivoted mirror 14 is employed to select the desired source and to focus radiation therefrom through a suitable double-aperture plate 16 and through a lens 15 onto an entrance slit 190. Plate 16 has the apertures 17 and 18 for providing two radiation beams 19 and 20. The beam 20 may at times be cut off, by the provision of a pivoted gate 21 which blocks aperture 18 when it is swing to the dotted view position thereof shown in FIG. 1. In the dual wavelength mode shown in full-line view in FIG. 1, the gate 21 allows radiation to pass through both apertures 17 and 18.

The beams 19 and 20 passing through the lens 15 are directed to a first inclined stationary mirror 21 and are reflected therefrom toward respective pivoted reflectance gratings 22 and 23 which operate as monochromators, providing the selection of two respective excitation beams 24 and 25 of different wavelengths. Said excitation beams are reflected from a second inclined stationary mirror 26 through a doublet focussing lens system including a fixed lens 114 and an adjustable lens 27 toward a 45° inclined reflective chopper disc 28 having a parallel stationary mirror 29 disposed behind its plane and located to receive beam 25 through the notches of the chopper disc, as diagrammatically illustrated in FIG. 1, to provide resultant time-shared beams 24,25 directed toward a stationary sample cell 30. Said time-shared beams, after travelling through sample cell 30 and its contents, impinge on the sensing portion of a photomultiplier tube 31.

Another parallel stationary mirror 32 is provided in the path of that portion of beam 24 passing through the notches of chopper disc 28, said mirror 32 being located so as to direct said passing beam portion toward a stationary reference cell 33 located adjacent the sensing portion of photomultiplier tube 31, as shown, to allow said passing beam portion to impinge on said sensing portion after passing through reference cell 33, whereby to provide a time-shared split-beam mode of operation. A pivoted gate 34 is provided between mirror 32 and reference cell 33, which, in the full-line position of FIG. 1, cuts off and rejects the passing portion of beam 24, whereas, in the dotted view position thereof it allows the passing portion of beam 24 to reach reference cell 33.

The chopper disc 28 is provided with a driving motor 35 which may be driven at either a relatively low speed, of the order of 3750 RPM, or at a relatively high speed, of the order of 15,000 RPM, and which is accurately stabilized by a synchronizing system 36 presently to be described.

To compensate for chromatic aberration, namely, for varying index of refraction of the material of focussing lenses 114 and 27 with different selected wavelengths of the excitation beam 24, provided by the pivotally adjustable monochromator grating 22, the position of lens 27 is adjusted along its optical axis by a lens adjusting mechanism 37, presently to be described, which couples lens 27 to grating 22.

As shown in FIGS. 2 and 3, the chopper disc comprises a transparent body on which is provided a layer of suitable opaque material having plane mirror surfaces on its opposite sides, shown respectively at 38 and 39, the disc being mounted so that it is inclined at an angle of approximately 45° to the axis of the focussing lens 27, as is diagrammatically illustrated in FIG. 1. The mirror surface 38 faces the photomultiplier tube 31. Said chopper disc is typically formed with four equally spaced notches 40, each subtending an angle of 45°, thereby defining four similarly spaced disc lobes 141, each likewise subtending an angle of 45°. Behind the chopper disc 28 are mounted a pair of Y-shaped fiber optic light pipe assemblies 41 and 42 having respective stem portions 43 and 44 whose ends are located at common radial distances from the axis of disc 28 and are spaced apart by an angle of 45°, being located to alternately transmit light to and receive light from the reflective rear surface 39 of the chopper disc lobes 141, as is diagrammatically shown in FIGS. 2 and 3.

The Y-shaped fiber optic light pipe assembly 41 has the light input arm 45 and the light output arm 46. A lamp 47 is mounted in a position to deliver light to the end of input arm 45 and a photo diode 48 is mounted adjacent the end of arm 46 in a position to receive resultant light pulses reflected from the chopper disc lobes 141. Thus, light from lamp 47 travels through input arm 45 and stem 43 and is reflected as periodic light pulses from the rear surfaces 39 of the lobes 141, travelling back through stem 43 and output arm 46 to the photo diode 48.

The Y-shaped fiber optic light pipe assembly 42 has the light input arm 49 and the light output arm 50. A lamp 51 is mounted in a position to deliver light to the end of input arm 49 and a photo diode 52 is mounted adjacent the end of arm 50 in a position to receive resultant periodic reflected light pulses from the output arm 50.

The reflected periodic light pulses received by the respective photo diodes 48 and 52 are in alternating sequence, and generate similarly time-spaced electrical signals which are essentially in phase with the time-shared excitation beams 24,25 furnished to the sample cell 30 in the dual wavelength mode of operation shown in full-line view in FIG. 1, and also in phase with the split beam components furnished respectively to the reference cell 33 and the sample cell 30 in the split beam mode of operation.

The time-spaced electrical signal pulses from the photo diodes 48 and 52 are delivered through respective amplifiers 53 and 54 to the inputs of respective pairs of monostable oscillators 55,56 and 57,58, thereby providing respective trains of narrow pulses 59 in the output conductors 61,62 of the monostable oscillators 55,56, and further trains of narrow pulses 60 in the output conductors 63,64 of the monostable oscillators 57,58. The pulses 59 and 60 are time-spaced in the same manner as the light pulses reaching the photo diodes 48 and 52 and are thus synchronized with the time-shared dual monochromatic beams 24,25 furnished to the sample cell 30 in the dual wavelength mode of operation, or with the split beam components furnished respectively to the reference cell 33 and sample cell 30 in the split beam mode of operation.

The spectrophotometer is provided with a photomultiplier response circuit 65 generally similar to that disclosed in the patent application of George W. Lowy et al., Ser. No. 291,046, filed Sept. 21, 1972, entitled "Dual Wavelength Photometer for Absorbance Difference Measurements," and in the patent application of R. Rodriguez, Ser. No. 297,279, filed Oct. 13, 1972, entitled "Dual Wavelength Photometer Response Circuit." In the circuit 65 the time-spaced signals generated in the photomultiplier tube 31 are delivered through a current-to-voltage amplifier 66 to the pole of a two-position selector switch 67. The stationary contacts of the switch 67 are connected respectively to the inputs of a conventional voltage amplifier 68 and a logarithmic amplifier 69. The outputs of the amplifiers 68 and 69 are connected to a conductor 70, which is in turn connected through respective appropriately triggered electronic switch devices 74 and 75 to respective "track and hold" integrating circuits 76 and 77 which generate corresponding steady d.c. output voltages representing the time-spaced pulse signal voltages furnished to conductor 70. These two steady d.c. output voltages are applied simultaneously to the two input conductors 71 and 72 of a differential amplifier 73. The output of amplifier 73, which substantially comprises the difference between the steady d.c. input signals from circuits 76 and 77 is delivered to a suitable indicator 78, such as a recorder.

The electronic switch devices 74 and 75 may comprise field effect transistors. The wire 61 is connected to the triggering electrode of the field effect transistor 74 and the wire 64 is connected to the triggering electrode of the field effect transistor 75. Thus, the electronic switch devices are triggered by the pulses 59 and 60 synchronously with the time-spaced light pulses reaching the photomultiplier tube.

The operation of the "track and hold" integrating circuit 76 is as follows: a pulse from conductor 70 passes through a resistor 78 and field effect transistor 74 to an input terminal 79 of an amplifier 80, and the amplified pulse appears at the output terminal 71 of amplifier 80. A capacitor 81 connected between input terminal 79 and output terminal 71 is charged to a d.c. voltage corresponding to the amplitude of the input-output voltage drop. A discharge resistor 82 is connected across capacitor 81 through field effect transistor 74 to allow the capacitor to adjust its charge with changing amplitudes of input pulses, the triggering of the field effect transistor being synchronized with the input pulses. Thus, a steady d.c. voltage appears at output terminal 71 which is in accordance with the amplitude of the input pulse applied at terminal 79, this steady d.c. voltage being maintained until the next triggering of the field effect transistor 74, at which time its value may be changed because of a different amplitude of the next input pulse. The "track and hold" integrating circuit 77 operates in the same manner.

The time-spaced trains of narrow pulses 59 and 60 are also present in the output conductors 62 and 63 of the monostable oscillators 56 and 57. Said conductors 62 and 63 are connected to the inputs of a summing amplifier 83 which combines these pulses to derive a composite pulse train and counts the composite pulses, deriving an output voltage signal representing the sum of the pulses per unit of time, said voltage signal appearing in the output conductor 84 of summing amplifier 83. Amplifier 83 is of conventional construction and includes a well known pulse counting circuit. The voltage signal in conductor 84 is thus in accordance with the actual speed of rotation of the chopper disc 28, since the pulse frequency of the composite pulses is directly proportional to the chopper disc speed.

The chopper disc driving motor 35 is energized from a d.c.-to-a.c. 400 cycle a.c. inverter 85 which may be connected either directly to the motor or through a speed-reducing resistor 86, the resistor being connected in a branch circuit containing a shunting switch comprising a switch pole 87 and associated contacts 96,97, forming part of a 2-pole, 2-position speed control switch assembly 88. As shown diagrammatically in FIG. 3, said branch circuit is connected between the output conductor 90 of inverter 85 and an input terminal of motor 35. The other pole 91 of switch 88 is connected to an input wire 92 of a differential amplifier 93, and said pole 91 may be operated, simultaneously with pole 87, to connect either a low reference voltage or a high reference voltage to wire 92. The summer output conductor 84 is connected to the remaining input terminal of the differential amplifier 93.

The output wire 94 of differential amplifier 93 is connected to the base of an inverter control transistor 95 connected in a d.c. supply conductor for the inverter 85. The transistor 95, which operates as a switch, is therefore turned on responsive to a predetermined differential voltage signal appearing at the output conductor 94 of the differential amplifier 93, namely, when a corresponding difference in voltage develops between input wires 84 and 92. Such a difference in voltage occurs when the chopper disc speed drops below a predetermined specific value, causing the inverter to be turned on by switch device 95 and causing it to bring the motor 35 back to the desired speed. When the desired speed is attained, inverter 85 is turned off by the resultant turning off of the switch device 95, allowing the motor to coast until the above-described regulating action is repeated. As a result, the chopper disc 28 may be maintained with a high degree of accuracy at either the selected relatively low speed, for example, 3750 RPM, or the selected relatively high speed, for example, 15,000 RPM, in accordance with the setting of the speed-selecting switch 88.

It will therefore be seen that the system employed for synchronizing the gating of the field effect transistors 74 and 75 with the time-shared light beams reaching the photomultiplier tube 31 and the system employed for regulating the speed of the chopper disc 28 are activated by common driving means comprising common optical and optical transducer components, namely, the lamps 47,51, the fiber optic light pipe assemblies 41,42, the photo diodes 48,52, and their associated amplifiers 53,54.

Figure 4:
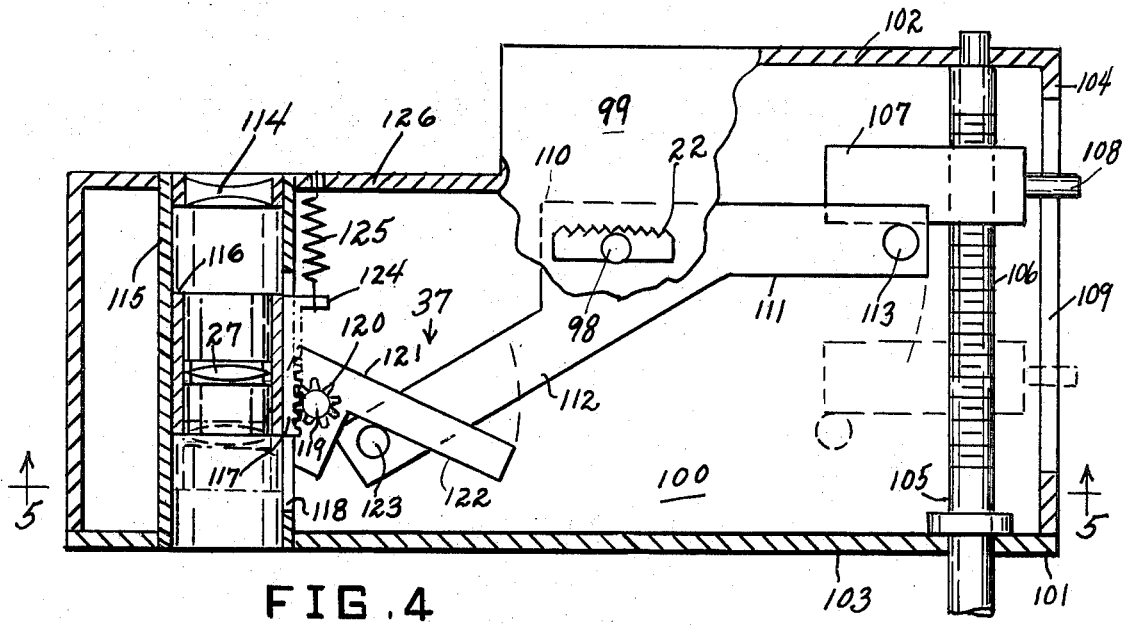
FIG. 4 is a vertical cross-sectional view taken through the focussing lens housing and the monochromatic grating adjusting assembly forming part of the spectrophotometer of FIG. 1, showing the mechanical coupling between the grating and the movable lens element for providing wavelength compensation.
Figure 5:
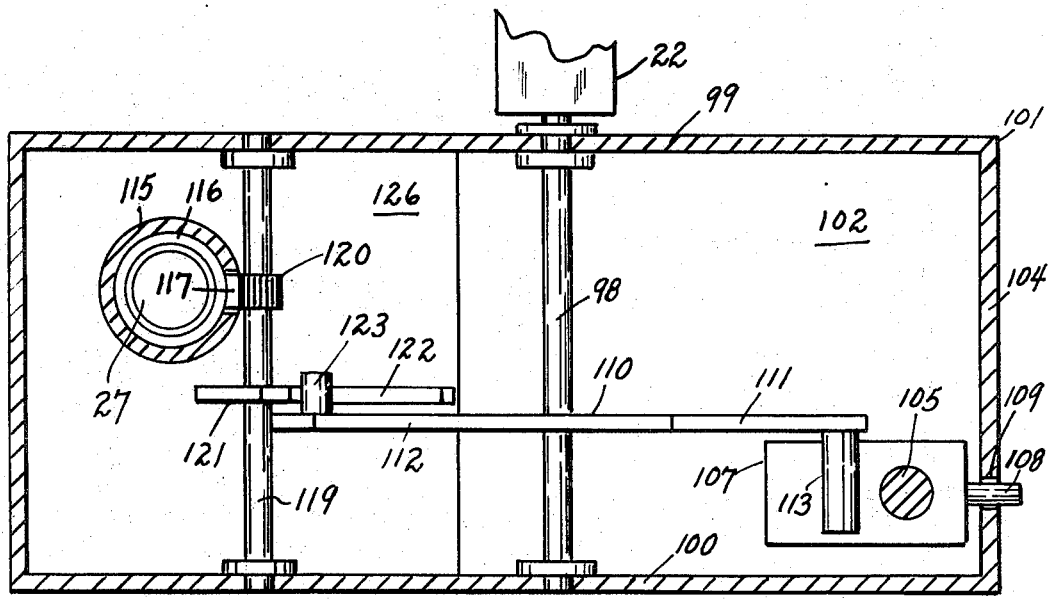
FIG. 5 is a cross-sectional view taken substantially on the line 5—5 of FIG. 4.

As shown in FIGS. 4 and 5, the monochromator grating 22 is mounted on one end of a supporting shaft 98 which is journalled in the opposite walls 99 and 100 of a housing 101. Journalled in opposite walls 102 and 103 of housing 101, transverse to shaft 98 and adjacent an end wall 104 of housing 101 is a grating control shaft 105 which is provided with threads 106 on which is engaged a travelling nut member 107, said nut member having an end pin 108 which is slidably engaged in a slot 109 formed in wall 104 parallel to shaft 106 and which prevents nut member 107 from rotating in housing 101. Rigidly secured on shaft 98 is a lever member 110 having a first arm 111 extending toward shaft 105 and having a second arm 112 extending at an obtuse angle to the first arm 111. Arm 111 has a pin 113 secured thereto which engages beneath nut member 107, as viewed in FIG. 4.

A focussing lens assembly of the doublet type is employed, comprising a fixed lens 114 mounted in a guide tube 115 secured in housing 101 and an adjustable lens 27 mounted in a carrier sleeve 116 slidably engaged in guide tube 115. Sleeve 116 is provided with a rack bar 117 fixedly secured thereto which extends slidably through a longitudinal slot 118 formed in tube 115. A pinion shaft 119 is journalled between walls 99 and 100 parallel to shaft 98 and is provided with a pinion gear 120 meshing with rack bar 117. Rigidly secured on shaft 119 is an arm 121 formed with a cam edge 122 which is engaged by a pin 123 secured on the end portion of arm 112. Rack bar 117 is formed at its upper end, as viewed in FIG. 4, with a lug 124, and a biasing coil spring 125 connects lug 124 to the adjacent wall portion 126 of housing 101, biasing pinion gear 120 and arm 121 in a clockwise direction, as viewed in said Figure. This urges cam edge 122 against pin 123 and thus biases lever member 110 counterclockwise, as viewed in FIG. 4, urging pin 113 against the travelling nut member 107. Thus, the grating 22 is coupled to movable lens element 27, because when control shaft 105 is rotated, nut member 107 moves along the threads 106 and pin 113 follows this movement, causing lever member 110 to rotate and thereby adjust the angular position of grating 22, while at the same time pin 123 moves along the cam edge 122 and causes arm 121 and pinion gear 120 to rotate and thereby move lens 27 element axially in tube 15. Cam edge 122 is suitably shaped and oriented to provide compensation for chromatic aberration of the focussing lens assembly.

As previously mentioned, the monochromator grating 23 is also pivotally mounted for angular adjustment so as to vary the wavelength of the monochromatic excitation beam 25. Suitably disengageable coupling means 130 is provided for at times coupling grating 23 to grating 22.

The spectrophotometer 11 may be operated in various different modes, such as the following:
1. Dual wavelength mode
2. Split beam mode
3. Dual wavelength scanning mode
4. Derivative mode
5. Rapid kinetic mode
6. Single beam mode.

In the *dual wavelength mode*, the monochromator grating 23 is set to provide a reference wavelength beam 25, such as at an isosbestic wavelength, and the monochromator grating 22 is set at a different nearby wavelength, such as at a nearby absorption peak wavelength, and the gate 34 is set in its closed position, with the gate 21 in its open position, as shown in full-line view in FIG. 1, so that the reference and sample beams 24,25 are time-shared through the sample cell 30.

In the *split beam mode*, the gate members 21 and 34 are set in their dotted view positions of FIG. 1, and only the beam 19 is employed. The monochromator grating 22 is used to scan either the entire usable wavelength range or a relatively small increment of the range, and the working beam 24 is time-shared through the reference cell 33 and the sample cell 30.

In the *dual wavelength scanning mode*, the gate members 21 and 34 are set in their full-line positions of FIG. 1 and monochromator grating 23 is set at a reference wavelength and monochromator grating 22 scans over a wavelength increment, with the monochromatic reference and sample beams 24,25 being time-shared through the single sample cell 30.

In the *derivative mode*, the gate members 21 and 34 are set in their full-line positions of FIG. 1 and the two monochromator gratings 23,22 are locked together, by means of coupling mechanism 130, at slightly different wavelengths, the two monochromatic beams 24,25 being time-shared through the single sample cell 30, and a derivative spectrum is obtained by scanning over a pre-selected wavelength range.

In the *rapid kinetic mode*, the optical chopper disc 28 is set to run, by means of switch 88, at the relatively high speed above-mentioned, namely, 15,000 RPM.

In the *single beam mode*, gate 21 is set in its dotted view position of FIG. 1, providing the single beam 19, and the gate 34 may be set in its full-line position, wherein a single monochromatic excitation beam 24 is provided through the sample cell 30.

While a specific embodiment of an improved multiple-function spectrophotometer has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A spectrophotometer comprising two monochromators adapted to provide two respective monochromatic beams of radiation, a photosensitive device, means to direct said two beams toward said photosensitive device substantially along a first optical path, time-sharing chopper disc means in said first optical path and having means to alternately direct said two monochromatic beams toward said photosensitive device along said first optical path, whereby said monochromatic beams can alternately pass through a transparent container placed in said first optical path between said chopper disc means and said photosensitive device to provide a dual wavelength mode of operation, and means to at times direct a portion of one of said monochromatic beams reaching said chopper disc means along a second optical path toward said photosenSitive device, whereby said portion can pass through a transparent reference container placed in said second optical path, to provide a split beam mode of operation, and wherein said chopper disc means has a driving motor, said chopper disc means including a notched disc defining spaced chopper segments, neans to detect variations in the speed of movement of said spaced chopper segments, and means to adjust the speed of said motor in accordance with such variations.

2. A spectrophotometer comprising two monochromators adapted to provide two respective monochromatic beams of radiation, a photosensitive device, means to direct said two beams toward said photosensitive device substantially along a first optical path, time-sharing chopper disc means in said first optical path and having means to alternately direct said two monochromatic beams toward said photosensitive device along said first optical path, whereby said monochromatic beams can alternately pass through a transparent sample container placed in said first optical path between said chopper disc means and said photosensitive device to provide a dual wavelength mode of operation, and means to at times direct a portion of one of said monochromatic beams reaching said chopper disc means along a second optical path toward said photosensitive device, whereby said portion can pass through a transparent reference container placed in said second optical path, to provide a split beam mode of operation, and wherein at least one of the monochromators is provided with means to vary the wavelength of its output monochromatic beam, said first-named directing means including an axially movable focussing lens element, and means coupling said lens element to said wavelength varying means to move the lens element so as to substantially compensate for chromatic aberration.

3. A spectrophotometer comprising two monochromators adapted to provide two respective monochromatic beams of radiation, a photosensitive device, means to direct said two beams toward said photosensitive device substantially along a first optical path, time-sharing chopper disc means in said first optical path and having means to alternately direct said two monochromatic beams toward said photosensitive device along said first optical path, whereby said monochromatic beams can alternately pass through a transparent sample container placed in said first optical path between said chopper disc means and said photosensitive device to provide a dual wavelength mode of operation, and means to at times direct a portion of one of said monochromatic beams reaching said chopper disc means along a second optical path toward said photosensitive device, whereby said portion can pass through a transparent reference container placed in said second optical path to provide a split beam mode of operation, and wherein said chopper disc means has a driving motor, said chopper disc means including a notched disc defining chopper segments, means spaced angularly relative to the axis of the chopper disc to count said segments as they move therepast, means to add together the counts obtained by said spaced means, and means to adjust the speed of said motor in accordance with variations in the total of the counts.

4. The spectrophotometer of claim 3, and wherein said photosensitive device is of a type generating electrical output pulse signals, respective integrating circuits connected to the output of said photosensitive device and being of a type generating steady d.c. voltages in accordance with the amplitudes of said pulse signals, and means to gate said integrating circuits synchronously with the count of said moving segments.

5. The spectrophotometer of claim 4, and means to compare said steady d.c. voltages.

6. The spectrophotometer of claim 2, and wherein said one of the monochromators comprises a reflectance grating provided with rotary supporting shaft means, and wherein said coupling means comprises a lever member secured on said shaft means, rack and pinion means drivingly connected to said movable lens element, and interengaging cam and follower means drivingly coupling said rack and pinion means to said lever member.

7. The spectrophotometer of claim 6, and wherein said cam and follower means comprises a projection on said lever member and a cam element operatively connected to said rack and pinion means and engaging said projection.

8. The spectrophotometer of claim 7, and means biasing said cam element into continuous engagement with said projection.

9. The spectrophotometer of claim 8, and means to operate said rotary shaft means so as to angularly adjust said reflectance grating, said operating means comprising a rotary screw member and a travelling nut member threadedly engaged on said rotary screw member and drivingly engaging said lever member.

10. The spectrophotometer of claim 9, and wherein said lever member is provided with a second projection and said travelling nut member is located so that said biasing means urges said second projection toward continuous engagement with said travelling nut member.

11. The spectrophotometer of claim 3, and wherein said chopper disc segments have reflective surfaces and wherein said counting and adding means comprises spaced fiber optic systems located to receive light reflections from said reflective surfaces and having respective photosensitive transducers generating pulse signals responsive to said light reflections, and means to derive a voltage representing the sum of said pulse signals, and wherein said speed-adjusting means comprises means to compare said sum with a reference voltage and derive a difference signal, and means to energize said motor responsive to said difference signal.

12. The spectrophotometer of claim 11, and wherein said photosensitive device is of a type generating electrical output pulse signals in accordance with the intensity of the beams impinging thereon, respective integrating circuits connected to the output of said photosensitive device, said integrating circuits being of a type generating steady d.c. voltages in accordance with the amplitudes of said last-named pulse signals, and means to gate said integrating circuits synchronously with said light reflections.

13. The spectrophotometer of claim 12, and a differential amplifier, circuit means connecting the steady d.c. voltage outputs of said integrating circuits to the inputs of said differential amplifier, and indicating means connected to the output of said differential amplifier.

14. A spectrophotometer comprising monochromator means adapted to provide a beam of monochromatic radiation, a photosensitive device, means to direct the monochromatic beam along an optical path leading to said photosensitive device, time-sharing chopper disc means in said optical path, said chopper disc means having a driving motor, said chopper disc means including a notched disc defining spaced chopper segments, means spaced angularly relative to the axis of the chopper disc to count said segments as they move therepast, means to add together the counts obtained by said spaced means, and means to adjust the speed of said motor in accordance with variations in the total of said counts.

15. The spectrophotometer of claim 14, and wherein said spaced counting means comprises spaced fiber optic systems located to sequentially receive light reflections from said segments and having respective photosensitive transducers generating pulse signals responsive to said light reflections, said adding means comprising means to derive a voltage representing the sum of said pulse signals, and said speed-adjusting means comprising means to compare said sum voltage with a reference voltage and derive a difference signal and means to energize said motor responsive to said difference signal.

16. The spectrophotometer of claim 14, and wherein said photosensitive device is of a type generating electrical output pulse signals in accordance with the intensity of the beams impinging thereon, respective integrating circuits connected to the output of said photosensitive device, said integrating circuits being of a type generating steady d.c. voltages in accordance with the amplitudes of said last-named pulse signals, and means to gate said integrating circuits synchronously with said counts.

17. The spectrophotometer of claim 15, and wherein said photosensitive device is of a type generating electrical output pulse signals in accordance with the intensity of the beams impinging thereon, respective integrating circuits connected to the output of said photosensitive device, said integrating circuits being of a type generating steady d.c. voltages in accordance with the amplitudes of said last-named pulse signals, and means to gate said integrating circuits synchronously with said light reflections.

18. The spectrophotometer of claim 14, and wherein said monochromator means is provided with means to vary the wavelength of its output monochromatic beam, said directing means including an axially movable focussing lens element, and means coupling said lens element to said wavelength-varying means to move the lens element so as to substantially compensate for chromatic aberration.

19. A spectrophotometer comprising monochromator means adapted to provide an output monochromatic beam of radiation and provided with means to vary the wavelength of its output monochromatic beam, a photosensitive device, means to direct the output monochromatic beam toward said photosensitive device along an optical path leading to said photosensitive device, said directing means including an axially movable lens element, and means coupling said lens element to said wavelength-varying means to move the lens element so as to substantially compensate for chromatic aberration.

* * * * *